Nov. 30, 1937.    U. QUINTAVALLE    2,100,453
TUNING DIAL FOR RADIO SETS
Filed Dec. 8, 1936    2 Sheets-Sheet 1

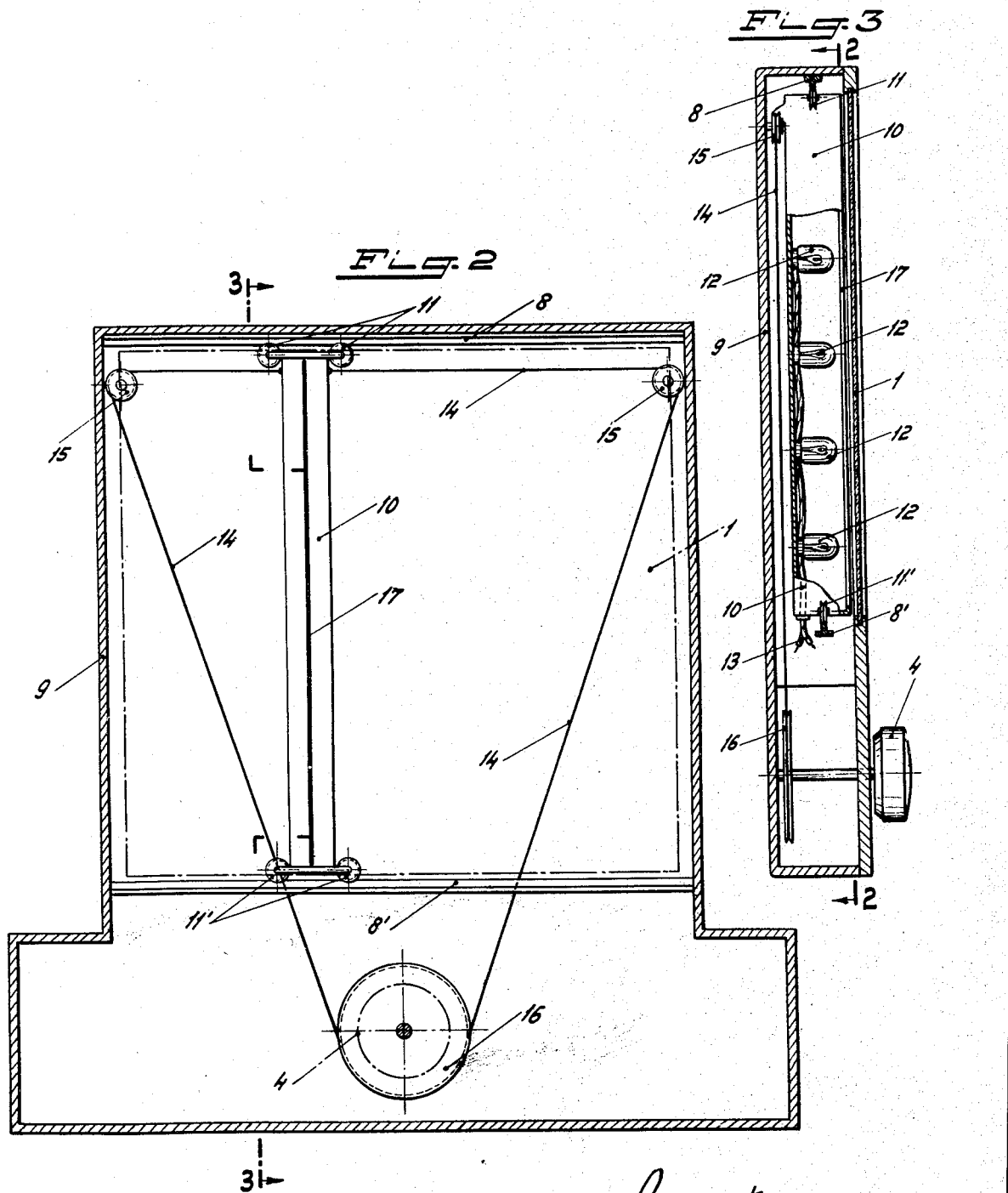

Patented Nov. 30, 1937

2,100,453

UNITED STATES PATENT OFFICE 2,100,453

TUNING DIAL FOR RADIO SETS

Umberto Quintavalle, Milan, Italy, assignor to Fabbrica Italiana Magneti Marelli Soc. An., Milan, Italy, a company of Italy Application December 8, 1936, Serial No. 114,819
In Italy December 20, 1935

7 Claims. (Cl. 116—124.1)

Tuning indicators for radio receivers are known which include a dial having a geographical map thereon on which the respective locations of sending stations are shown and a pointer arranged to move across said dial; these indicators are subject to the objection that the several stations are not by order of frequency of their own operative wave in respect of the movement of the pointer across said dial and accordingly the operator at the moment he wants to tune from a given station into another station has no suggestion as to the position of the wanted station along the frequency scale nor as to direction in which the tuning control is to be manipulated in order to tune into the wanted station.

The present invention has for its object a tuning indicating device which removes the above stated objections and provides for easily tuning into the several stations in terms of their respective geographical location.

An embodiment of this invention is illustrated by way of example in the annexed drawings in which:

Fig. 2 is a section showing the provision of a light pointer arranged to move behind said dial and made on line 2—2 of Fig. 3; and Fig. 3 is a transverse vertical section on line 3—3 of Fig. 2.

Figure 1:
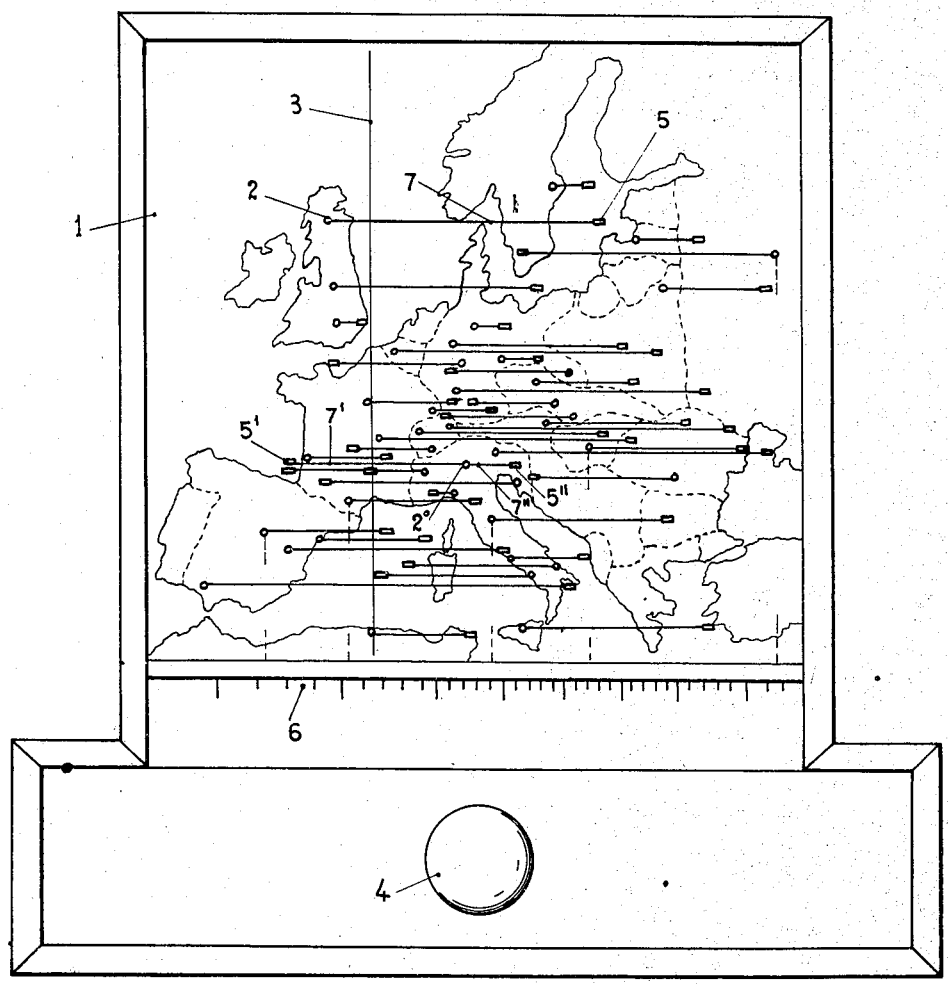
Fig. 1 is a front view showing the dial mounted on a support therefor.

In the illustrated embodiment 1 is a dial on which a map of a desired region is shown; on said map a spot is provided in register with the geographical location of each sending station to be tuned into, said spot consisting in the illustrated embodiment of a small circle 2 in register with said geographical location of the station on the map.

A pointer shown in the drawings as a line 3, is mounted to move across said dial 1 and is connected in any preferred and conventional manner with the tuning means shown by the knob 4; said tuning means may be of any preferred or conventional construction and includes means operated by the knob 4 and operating the tuning element of the radio set as well as the pointer 3 in unison; the pointer 3 accordingly moves in proportion with progressive variation of frequency, the values of frequency being shown on a scale 6 extending across the geographical map or representation.

Each of said spots 2 has a position on said dial 1 which depends upon the geographical location of a sending station, and it is associated by a leading line 7 with a mark 5 provided across said dial in a location which depends upon the value of frequency on which said sending station operates.

Two or more frequency marks are provided in respect of spots individuating the locations where two or more sending stations operative on different frequencies are located, and such marks shown in 5', 5'' in respect of a spot 2⁰ are coupled thereto by means of one or more leading lines as 7, 7'.

When it is desired to tune the radio receiver set on a sending station having a known geographical location individuated by a spot as 2 or 2⁰, the knob 4 is manipulated to carry the pointer 3 in register with a mark as 5, or 5' or 5'' connected with said spot 2 or 2⁰ by a leading line 7 or 7' or 7''.

When on the contrary it is desired to individuate an unknown station coming into at a time the pointer 3 has a given position across the dial, the operator ascertains along the said pointer 3 the particular mark 5 or 5' or 5'' said pointer intersects; then the line 7, 7' connected with said mark leads to the spot 2 or 2⁰ defining on the dial 1 the geographical location of said station.

To differentiate said spots and marks as 2, 5, etc., they may have sharply different shapes as illustrated, and they or a number of them may be proper to be made visible by means of a light source located at the rear of the dial and by making said spots and marks or dial translucent as conventional; the marks pertaining to stations having the same location and operating on different frequencies may have different configurations or colours.

The pointer 3 may also be provided with a light source for the purpose of illuminating apertures made in the dial 1 to provide the marks as 5, 5', 5''.

It is to be understood that means for actuating the pointer 3 in accordance with tune control may be of any desired construction. Figures 2 and 3 illustrate the provision of a light pointer arranged to move behind the dial 1. As illustrated in said figures, two horizontal guide bars 8, 8' are fastened in the support 9 behind the dial 1 at the top and bottom thereof respectively, and an elongated casing 10 has rollers 11, 11' pivotally mounted adjacent its ends to run on said guide bars 8, 8'; said casing 10 is coextensive with the height of the dial 1 and a longitudinal slot 17 extends throughout its front wall facing the dial 1.

Lamps 12 are located in the casing 10 and are fed from a source of electric current by means of leads 13.

A cord 14 has its ends connected with one end of casing 10; said cord 14 runs on pulleys 15 loosely pivoted on the support 9 and over a driving pulley 16 fast with the tune control knob 4.

When the feeding circuit of lamps 12 is closed, said lamps cause a linear light beam to emanate through slot 17 of the casing 10 and said linear beam may be caused to traverse the dial 1 by the manipulation of the knob 4.

What I claim as my invention and desire to secure by United States Letters Patent is:—

1. In a radio receiving set, a dial having a geographical map thereon, a spot on said map in register with the geographical location of a sending station, a mark having a position corresponding with the operating frequency of said station by terms of progression of frequency, a leading line connecting said spot and mark and a pointer movable in progression of frequency across said dial.

2. In a radio receiving set, a dial having a geographical map thereon, spots on said map each in register with a geographical location, marks each having a position corresponding with the operating frequency of a sending station in said location said marks being located in progression of frequency across said dial, leading lines connecting said spots and marks pertaining to each given location and a pointer movable in progression of frequency across said dial.

3. In a radio receiving set, a dial having a geographical map thereon, a spot on said map in register with a geographical location, marks on said dial each having a position corresponding with the operating frequency of radio sending stations in said location by terms of progression of frequency, leading lines from said marks to said spot, and a pointer movable in progression of frequency across said dial.

4. In a radio receiving set, a dial having a geographical map thereon, a spot on said map in register with a geographical location, marks on said dial each having a position corresponding with the operating frequency of radio sending stations in said location by terms of progression of frequency, said marks being differentiated by their colours, leading lines from said marks to said spot, and a pointer movable in progression of frequency across said dial.

5. In a radio receiving set, a dial having a geographical map thereon, a spot on said map in register with a geographical location, marks on said dial each having a position corresponding with the operating frequency of radio sending stations in said location by terms of progression of frequency, said marks being differentiated by their configurations, leading lines from said marks to said spot, and a pointer movable in progression of frequency across said dial.

6. In a radio receiving set, a dial having a geographical map thereon, spots on said map each in register with a geographical location, marks having a position corresponding with the operating frequency of a sending station in said location said marks being located in progression of frequency across said dial said spots and said marks being differentiated by their respective colours, leading lines connecting said spots and marks pertaining to each given location and a pointer movable in progression of frequency across said dial.

7. In a radio receiving set, a dial having a geographical map thereon, spots on said map each in register with a geographical location, marks each having a position corresponding with the operating frequency of a sending station in said location said marks being located in progression of frequency across said dial said spots and said marks being differentiated by their respective configurations, leading lines connecting said spots and marks pertaining to each given location and a pointer movable in progression of frequency across said dial.

UMBERTO QUINTAVALLE.